(12) United States Patent
Parsons et al.

(10) Patent No.: US 8,867,491 B2
(45) Date of Patent: *Oct. 21, 2014

(54) METHOD AND SYSTEM FOR MAINTAINING MULTIPLE PDN NETWORK CONNECTION DURING INTER-TECHNOLOGY HANDOVER IN IDLE MODE

(71) Applicant: Apple Inc., Cupertino, CA (US)

(72) Inventors: Eric Parsons, Stittsville (CA); Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/734,067

(22) Filed: Jan. 4, 2013

(65) Prior Publication Data

US 2013/0142172 A1 Jun. 6, 2013

Related U.S. Application Data

(63) Continuation of application No. 12/934,452, filed as application No. PCT/IB2009/005654 on Mar. 25, 2009, now Pat. No. 8,369,284.

(60) Provisional application No. 61/039,252, filed on Mar. 25, 2008.

(51) Int. Cl.
| | | |
|---|---|---|
| *H04W 4/00* | (2009.01) | |
| *H04W 36/00* | (2009.01) | |
| H04W 36/14 | (2009.01) | |
| H04W 48/18 | (2009.01) | |
| H04W 76/04 | (2009.01) | |

(52) U.S. Cl.
CPC .............. *H04W 36/00* (2013.01); *H04W 36/14* (2013.01); *H04W 48/18* (2013.01); *H04W 76/04* (2013.01); *H04W 36/0033* (2013.01)
USPC .......................................... 370/331; 370/338

(58) Field of Classification Search
USPC ......... 370/331, 332, 333, 334, 335, 338, 466, 370/468, 389, 471, 328, 329, 351, 356, 401, 370/402; 455/436, 445, 432.1, 433, 434, 455/435.1; 709/228, 227

See application file for complete search history.

(56) References Cited

U.S. PATENT DOCUMENTS

| 7,411,922 B1 | 8/2008 | Savunen |
|---|---|---|
| 7,583,632 B2 | 9/2009 | Janevski et al. |

(Continued)

OTHER PUBLICATIONS

First Office Action and translation thereof in Chinese Patent Application No. 200980110169, Feb. 5, 2013, pp. 1-10.

(Continued)

*Primary Examiner* — Chi H Pham
*Assistant Examiner* — Alexander O Boakye
(74) *Attorney, Agent, or Firm* — Meyertons, Hood, Kivlin, Kowert & Goetzel, P.C.

(57) ABSTRACT

Supporting an optimized idle mode handoff of user equipment from a 3GPP to a non-3GPP system. Namely, during an idle mode registration of the user equipment with the non-3GPP system, the user equipment may provide an indication to the access node on the non-3GPP system so that the access point in that non-3GPP system contacts the appropriate entity (HSS or AAA) on the home network for the user equipment to download the addresses of the multiple PDN gateway addresses that are currently in use by the user equipment. This indication to the non-3GPP access node, the contact message from the access node to the home network, and the response from the home network to the access node on the non-3GPP system provide the access node with sufficient information to maintain multiple PDN connectivity to the user equipment during an idle mode handover.

14 Claims, 2 Drawing Sheets

(56) References Cited

U.S. PATENT DOCUMENTS

| | | | |
|---|---|---|---|
| 7,760,704 | B2 | 7/2010 | Menon et al. |
| 7,843,878 | B2 | 11/2010 | Morales et al. |
| 8,064,877 | B2 * | 11/2011 | Li et al. .................. 455/406 |
| 8,203,997 | B2 | 6/2012 | Zhao et al. |
| 8,249,551 | B2 * | 8/2012 | Jones et al. ............ 455/406 |

OTHER PUBLICATIONS

Extended European Search Report in Application No. 12177003.6-2412, Nov. 9, 2012, pp. 1-6.

ZTE: "Inter access system handover between 3GPP and non 3GPP access systems", 3GPP Draft; S2-061497 Interacess Non3GPP, 3rd Generation Partnership Project (3GPP), Mobile Competence Centre; 650, Route Des Lucioles; F-06921 Sophia-Antipolis Cedex; France, vol. SA WG2, no. Shanghai; 20060502, May 2, 2006, XP050255684, pp. 1-4.

3GPP: "3GPP TS 23.402 V8.1.1 (Mar. 2008); Technical Specification Group Services and System Aspects; Architecture enhancements for non-3GPP accesses (Release 8) "[Online] Mar. 13, 2008, pp. 128-136, XP002551026, Retrieved from the Internet: URL:<http://www.3gpp.org/ftp/Specs/archive/23_series/23.402/23402 -811.zip> [retrieved on Oct. 13, 2009] cited in the application p. 135-p. 136; figures 9.4-1.

Nortel et al: "Handling of multiple PDNs during Idle mode mobility from E-UTRAN to HRPD," 3GPP Draft; S2-084070_WAS3815_ 23402_CR0324_LTE_TO_HRPD_IDLE_MODE_MPDN, 3rd Generation Partnership Project 2 (3GPP), Mobile Competence Centre; 650, Route des Lucioles; F-06921 Sophia-Antipolis Cedex; France, vol. SA WG2, no. Prague; 20080516, May 16, 2008, XP050266223 [retrieved on May 16, 2008], pp. 1-3.

* cited by examiner

METHOD AND SYSTEM FOR MAINTAINING MULTIPLE PDN NETWORK CONNECTION DURING INTER-TECHNOLOGY HANDOVER IN IDLE MODE

RELATED APPLICATION DATA

This application is a continuation of U.S. patent application Ser. No. 12/934,452, filed Sep. 24, 2010 which is a Submission Under 35 U.S.C. §371 for U.S. National Stage Patent Application PCT/IB2009/005654, filed Mar. 25, 2009, which claims priority to Provisional Patent Application Serial No.61/039,252 filed on Mar. 25, 2008, all of which are incorporated by reference in their entirety as if fully and completely set forth herein.

TECHNICAL FIELD OF THE INVENTION

A method and system for maintaining multiple PDN network connections during inter-technology wireless handover in idle mode.

BACKGROUND OF THE INVENTION

When a mobile unit is traveling, it may need to be handed off from one network to another. There are different types of wireless communication systems, such as general packet radio service (GPRS), global system for mobile (GSM)/enhanced data rates for GSM evolution (EDGE) radio access network (GERAN), and long term evolution (LTE) evolved universal terrestrial radio access network (EUTRAN). LTE/EUTRAN system has a different physical layer and a different architecture from those systems preceding it, i.e., GPRS, GERAN, or UTRAN. Since not all networks are identical, a method for supporting the handoff between systems would be beneficial.

United States Patent Publication Nos. US 2008/0268846A1 and 2008/0192697A1 describe a prior art method and system for supporting a handoff of user equipment from a GPRS/GERAN system to an LTE EUTRAN system, and vice versa, respectively. These references include a FIG. 1 exemplary diagram of a system including an LTE system architecture shown by an LTE/EUTRAN and its evolved packet core interworking with an existing GERAN, UTRAN, and their GPRS Core. The LTE/EUTRAN comprises an E-Node B that is connected (S1) to an evolved packet core containing a mobility management entity/user plane entity (MME/UPE) and an inter AS anchor Gateway. The Evolved Packet Core connects (S6) to a home subscriber service (HSS), and connects (S7) to a Policy and Charging Rules (PCRF). The inter AS Anchor gateway connects (Gi) to Operator IP Servers (such as IMS, PSS), connects (S2) to a Non-3GPP IP Access network 108, and connects (S2) to a WLAN 3GPP IP Access network 109.

The GPRS Core shown in FIG. 1 of these prior art references comprises a Serving GPRS Support Node (SGSN) which is responsible for Mobility Management, Access Procedures, and User Plane Control. The GPRS Core also comprises a Gateway GPRS Support Node (GGSN), where the network is connected to external networks and other operator servers. The Non-3GPP IP access network 108 includes connections to other technologies that are developed in other standard Forums such as 3GPP2 (CDMA2000) and WiMAX (IEEE 802.16 system). The WLAN 3GPP IP access network has WLANs incorporated into 3GPP systems via interworking architecture defined in 3GPP. These identified patent references, however, do not address the optimized handover procedures and system for an idle mode handover of user equipment from a 3GPP (EUTRAN) to a non-3GPP (HRPD cdma2000) system where the user equipment wishes to maintain connectivity with multiple PDN networks.

The Technical Specification 3GPP TS 23.402 V8.1.1 (2008-03) describes a 3rd Generation Partnership Project (3GPP) Technical Specification for enhancements and interactions with non-3GPP accesses. The particular version of the Technical Specification is Release 8, which describes the general network resources, entities, functions, and handover procedures for certain inter-technology combination handover systems, protocols, and procedures. Like the above-identified references, this Technical Specification also fails to address the optimized handover procedures and system for an idle mode handoff of user equipment from a 3GPP (EUTRAN) to a non-3GPP system (HRPD cdma 2000) where the user equipment wishes to maintain connectivity with multiple PDN networks. It would be beneficial to have a method and system that could support such an idle mode handover while maintaining the user equipment's connectivity to multiple PDN networks.

SUMMARY OF THE INVENTION

The present invention provides a method and system for supporting an optimized idle mode handoff of user equipment from a 3GPP (EUTRAN) to a non-3GPP system (HRPD, cdma2000) where the user equipment wishes to maintain connectivity with multiple PDN networks. Namely, when the user equipment establishes its presence with the non-3GPP system in idle mode, the user equipment will provide an indication to the access node on the non-3GPP system so that the access node in that non-3GPP system contacts the appropriate entity (HSS or AAA) on the home network for the user equipment to download the addresses of the multiple PDN gateway that are currently in use by the user equipment. This indication to the non-3GPP access node, the contact message from the access node to the home network, and the response from the home network to the access node on the non-3GPP system are novel features that are not shown in the prior art, and provide the access node with sufficient information to maintain multiple PDN connectivity to the user equipment during an idle mode handover.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
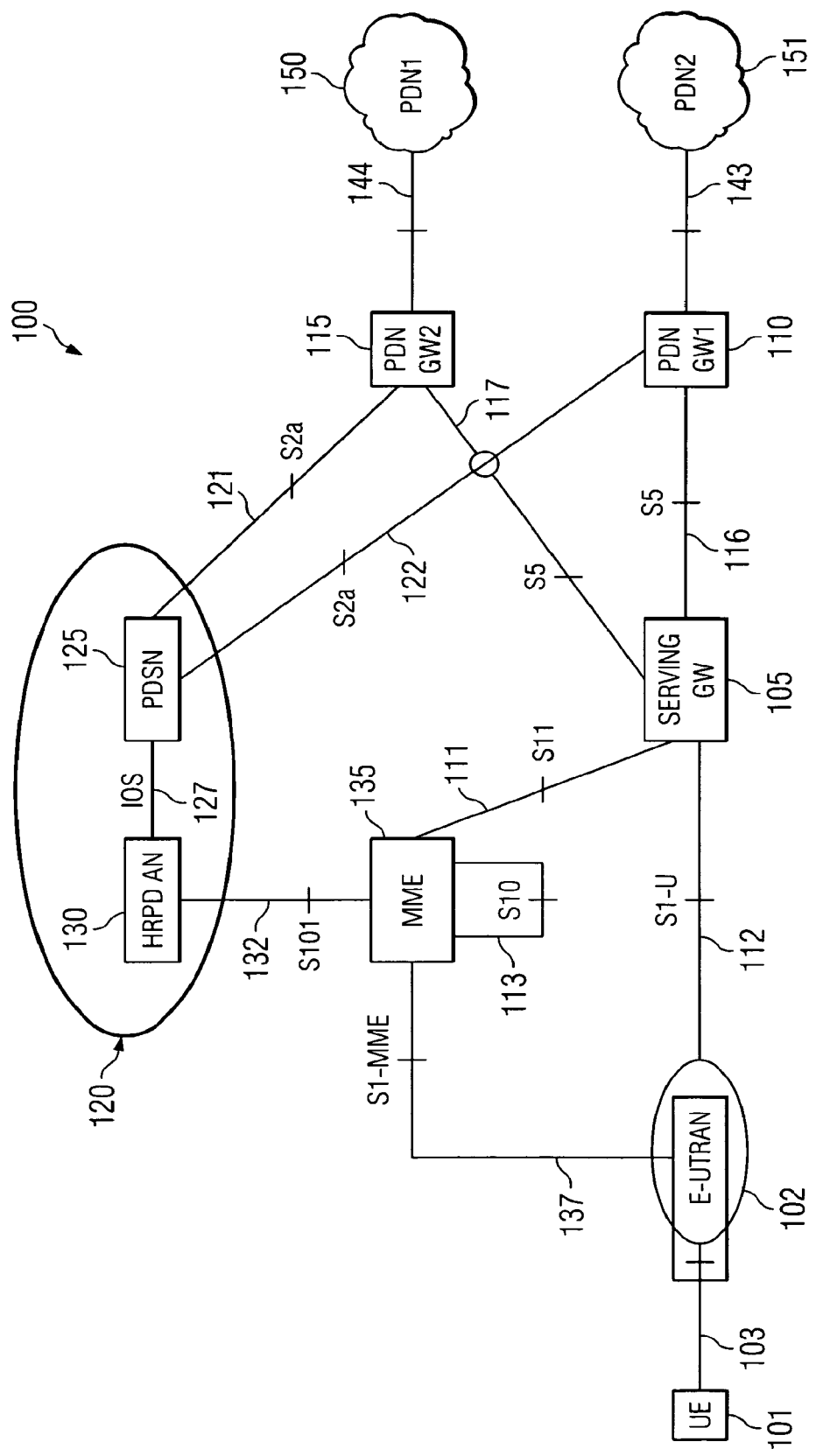
FIG. 1 is a mobile IP-based communication system showing the user equipment, the 3GPP based network, the non-3GPP network and the multiple PDN connections to the user equipment, and, FIG. 2 is a handover protocol of the user equipment to the non-3GPP system with the disclosure of the indication message, the access node request message to the home network, and the response to the access node.

Referring to FIG. 1, the present invention proposes a solution to the idle mode handover of user equipment from a 3GPP network to a non-3GPP network that includes providing the access node on the non-3GPP network with the addresses for the multiple PDN gateway connections currently being used by the user equipment, which are shown as PDN Gateway 1 110 and PDN Gateway 2 115. The handover occurs in FIG. 1 from the E-UTRAN network 102 to the HRPD network 120 in the present invention so that multiple PDN network connectivity can be maintained with the user equipment 101 during the idle mode handover. In this example, the E-UTRAN network 102 is a 3GPP network called the source network, and the HRPD network 120 is a non-3GPP network called the target network.

In the prior art, the HSS on the home network (not shown in FIG. 1) receives the values of the addresses of all allocated PDN Gateways (110 and 115) and the corresponding PDN information for a given user equipment 101 assigned to the HSS's home network from both the 3GPP AAA (not shown) and also from the MME 135, depending on the currently in-use access. The HSS on the home network is responsible for the storage of PDN Gateway address information. In an active mode handover in the prior art, if user equipment is attached to a non-3GPP access and it already has assigned PDN Gateways (110 and 115) due to a previous attach in a 3GPP access, the HSS on the home network provides the IP address(es) of the already allocated PDN Gateway(s) (110 and 115) with the corresponding PDN information to the 3GPP AAA server over the SWx reference point. The PDN gateway's address(es) is sent during the attach procedure in the non-3GPP access. Also in active mode, if user equipment 101 attaches to a 3GPP access and it already has an assigned PDN Gateway(s) 110 and 115 due to a previous attach in a non-3GPP access, the HSS provides the IP address(es) of the already allocated PDN Gateway(s) (110 and 115) with the corresponding PDN information to the MME over the S6a reference point, and the PDN gateway address(es) is sent during the attach procedure in the 3GPP access.

No prior art procedures support the handover of user equipment in a non-active, idle mode so that connectivity can be maintained with multiple PDN connections, and no prior art procedures allow for the direct interaction between the access node of the non-3GPP network and the HSS entity/AAA server on the home entity to acquire the multiple PDN gateway addresses. By "idle mode," the applicant means that the system is not operating in an active or connected mobility mode procedure, and the "idle mode" can be characterized by an idle mobility procedure or a radio link failure scenario. The present invention supports such an "idle mode" transfer of user equipment with multiple PDN gateway connections.

Referring to FIG. 1, the network 100 shows the various network components involved with the idle mode inter-technology handover with connectivity to multiple PDN networks. The user equipment 101 is coupled to the E-UTRAN network (3GPP) 102 through connection 103. When referred to hereafter, the terminology user equipment (UE) includes, but is not limited to, a mobile station, a fixed or mobile subscriber unit, a pager, a cellular telephone, a personal digital assistant (PDA), a computer, or any other type of user device capable of operating in a wireless environment.

The E-UTRAN network 102 is coupled through SI-U connection 112 to the Serving Gateway 105, which is coupled to PDN Gateway 1 110 and PDN Gateway 2 115 through connections S5 116 and 117, respectively. The PDN Gateway 1 110 and PDN Gateway 2 115 couple the multiple PDN networks 150 and 151, which are coupled by connections 143 and 144, respectively. SGi1 142 and SGi2 141 interfaces are coupled to PDN sources of data located on the Internet 150 through connections 151 and 152, respectively. Maintaining these multiple PDN connections during an idle handover of the user equipment 101 from the E-UTRAN 102 system to a non-3GPP system, such as the HRPD system 120 shown in FIG. 1 is the primary focus of the present invention.

The E-UTRAN network 102 is coupled through S1-MME connection 137 to the Mobility Management Entity (MME) 135, which has an internal S10 connection 113. The MME 135 is coupled to the Serving Gateway 105 through connection S11 111, and the MME 135 is couple to the HRPD Access Node 130 on the HRPD system 120 through S101 connection 132. The HRPD Access Node 130 is coupled to the Packet Data Switching Node (PDSN) 125 through the Interoperability Specification (IOS) connection 127. The PDSN 125 is sometimes called the HRPD Serving Gateway (HSGW), which is coupled to the PDN Gateway 1 110 and PDN Gateway 2 115 through the S2a connections 122 and 121, respectively.

The HRPD Access Node 130 will be provided with a connection request in idle mode from the user equipment 101, and the connection request will include an indication from the user equipment 101 that multiple PDN connections are in use by the user equipment 101. This indication will prompt the HRPD Access Node 130 to send a request to the home subscriber storage (HSS) entity and/or Authentication, Authorization and Accounting (AAA) server located on the home network (not shown in FIG. 1) assigned to the user equipment 101 to request the addresses of all PDN gateways (110 and 115) currently in use by the user equipment. The HSS entity and/or AAA server on the home network will respond to the request with the addresses of all PDN gateways currently in use by the user equipment 101 so the multiple PDN connectivity with the user equipment 101 can be maintained during the idle mode handover.

Figure 2:
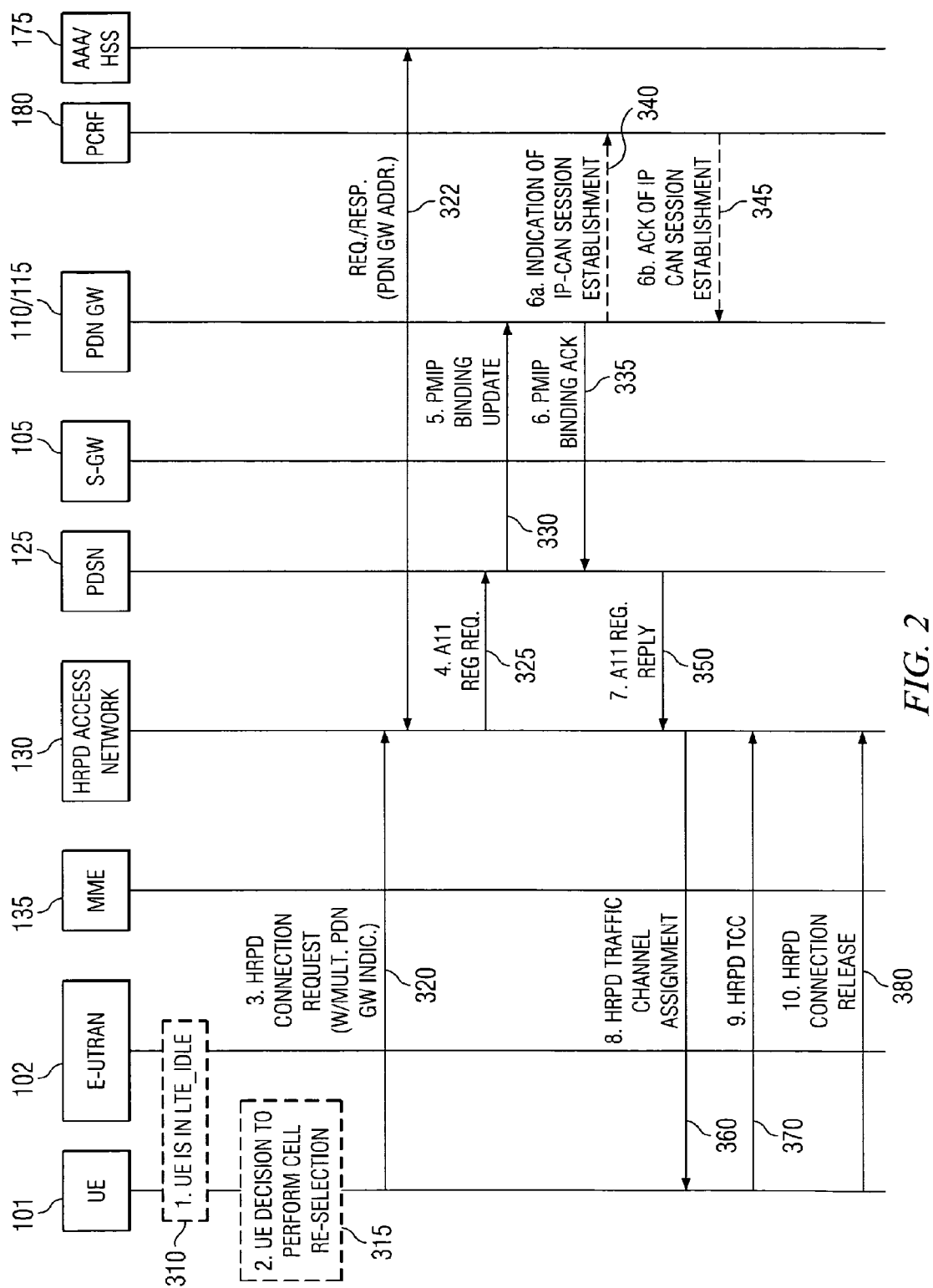

In FIG. 2, the handover communication protocol is shown starting at step 310 when the user equipment is designated as being in idle mode. The user equipment makes a decision to "re-select" its cell location in step 315 to the non-3GPP network, and the user equipment 101 sends a HRPD Connection Request message in step 320 to the HRPD Access Node 130. This HRPD Connection Request message in step 320 would include an indication that the user equipment 101 is currently using multiple PDN connections.

In response to this indication, the HRPD Access Node 130 will send a request message 322 to the AAA server/HSS entity 175 located on the home network assigned to the user equipment in step 322. In step 322, the AAA server/HSS entity 175 will respond to that request with the addresses for the multiple PDN gateways and any other relevant information regarding the PDN connections currently in use by the user equipment 101, such as IP addresses of the already allocated PDN Gateway(s) (110 and 115) and corresponding PDN information.

The HRPD Access Node will transmit an A11 registration request message to the PDSN 125 on the non-3GPP network in step 325, which will include the address information for the multiple PDN gateways 110 and 115 currently in use by the user equipment. The PDSN 125 will use the address information to send a PMIP message to the PDN gateways 110 and 115 in step 330, which will be acknowledged by response messages to the PDSN 125 from the PDN gateways 110 and 115 in step 335. The PDN gateways 110 and 115 will send messages to the PCRF entities in step 340, and receive a response from the PCRF entities in step 345.

After receiving the response from the PDN gateways 110 and 115 in step 335, the PDSN on the non-3GPP network will send an A11 registration reply to the HRPD Access Node 130 in step 350. The HRPD Access Node will send the user equipment 101 an HRPD Traffic Channel Assignment in step 360 to establish the connection with the user equipment 101.

The user equipment 101 will then send an HRPD TCC (traffic channel complete) message to the HRPD Access Node 130 in step 370. The user equipment 101 may also send an HRPD Connection Release message to the HRPD Access Node 130 in step 380. After these connections are established, any future user equipment 101 communication traffic may flow in both the uplink and downlink directions via the non-3GPP network, including traffic through the multiple PDN connections which have been maintained after the handover to the non-3GPP network.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, we claim:

1. A mobile node configured to maintain multiple PDN connections during an idle mode handover from a source network operating under the 3GPP communications protocol to a target network operating under a non-3GPP communications protocol, comprising:
    communication circuitry configured to communicate with the source network and the target network; and
    hardware coupled to the communication circuitry, wherein the hardware is configured to generate a connection request message, wherein the connection request is configured to establish the presence of the mobile node with the target network and wherein the connection request message comprises an indication that multiple PDN connections are currently in use by the mobile node;
    wherein the communication circuitry is configured to transmit the connection request message to an access node on the target network;
    wherein the access node is configured to transmit a request message to a home subscriber storage entity on a home network assigned to the mobile node;
    wherein the access node is configured to receive a response message from the home subscriber storage entity on the home network assigned to the mobile node, said response message including addresses for all PDN gateways currently in use by the mobile node;
    wherein the access node is configured to transmit the PDN gateway addresses to a control entity on the target network so that access can be established with the PDN gateways to maintain the PDN connections with the mobile node after the handover of mobile node communications to the target network.

2. The mobile node of claim 1, wherein the control entity on the target network is a PDSN entity or an HRPD serving gateway.

3. The mobile node of claim 1, wherein the access node on the target network is an FIRPO access node.

4. The mobile node of claim 1, wherein the address information for the PDN gateways also includes all IP addresses of the PDN gateways with corresponding PDN information.

5. The mobile node of claim 1, wherein the control entity is a PDSN control entity, wherein the PDSN control entity is configured to establish access with the multiple PDN gateways using a PMIP binding update request message.

6. The mobile node of claim 1, wherein the request message received by the access node is an HRPD connection request message.

7. The mobile node of claim 1, wherein the home subscriber storage entity is a AAA server on the home network.

8. A method for maintaining connectivity between user equipment and multiple PDN connections during an idle mode handover from a source network operating under the 3GPP communications protocol to a target network operating under a non-3GPP communications protocol, comprising the steps of:
    providing a connection request message to an access node on the target network from the user equipment, said connection request message establishing the presence of said user equipment with the target network and including an indication that multiple PDN connections are currently in use by the user equipment;
    wherein the access node is configured to transmit a request message to a home subscriber storage entity on a home network assigned to the user equipment;
    wherein the access node is configured to receive a response message from the home subscriber storage entity on the home network assigned to the user equipment, said response message including addresses for all PDN gateways currently in use by the user equipment;
    wherein the access node is configured to transmit the PDN gateway addresses to a control entity on the target network so that access can be established with the PDN gateways to maintain the PDN connections with the user equipment after the handover of user equipment communications to the target network.

9. The method of claim 8, wherein the control entity on the target network is a PDSN entity or a HRPD serving gateway.

10. The method of claim 8, wherein the access node on the target network is an FIRPO access node.

11. The method of claim 8, wherein the address information for the PDN gateways also includes all IP addresses of the PDN gateways with corresponding PDN information.

12. The method of claim 8, wherein the control entity is a PDSN control entity, wherein the PDSN control entity is configured to establish access with the multiple PDN gateways using a PMIP binding update request message.

13. The method of claim 8, wherein the request message received by the access node is an HRPD connection request message.

14. The method of claim 8, wherein the home subscriber storage entity is a AAA server on the home network.

* * * * *